(No Model.)
E. THOMSON.
APPARATUS FOR ELECTRIC WELDING.
No. 386,441. Patented July 17, 1888.
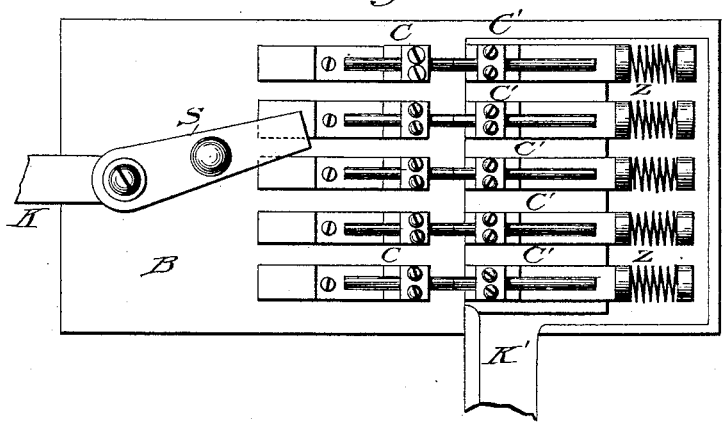
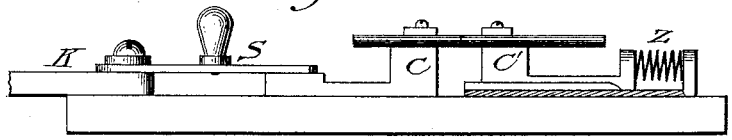
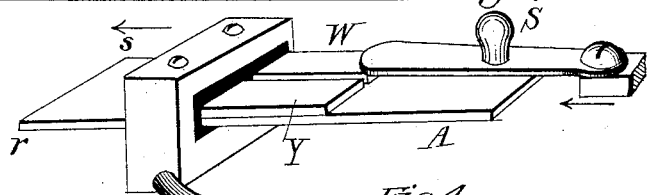
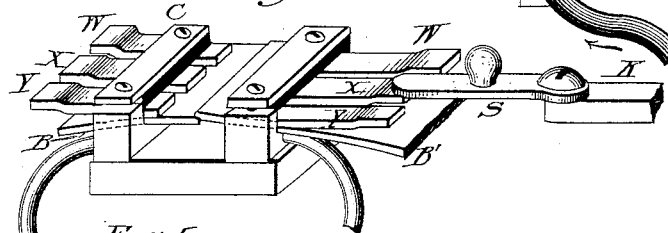
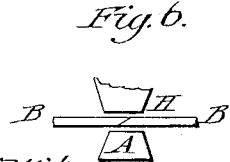
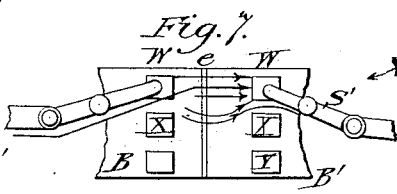
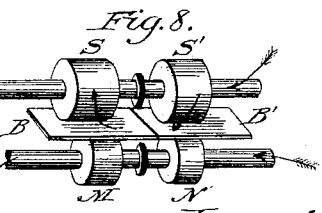
Witnesses.
Ira R. Steward.
[signature]
Inventor.
Elihu Thomson,
By Townsend & MacArthur,
Attys.
N. PETERS, Photo-Lithographer, Washington, D. C.

UNITED STATES PATENT OFFICE.

ELIHU THOMSON, OF LYNN, ASSIGNOR TO THE THOMSON ELECTRIC WELDING COMPANY, OF BOSTON, MASSACHUSETTS.

APPARATUS FOR ELECTRIC WELDING.

SPECIFICATION forming part of Letters Patent No. 386,441, dated July 17, 1888.

Application filed July 28, 1887. Serial No. 245,555. (No model.)

*To all whom it may concern:*

Be it known that I, ELIHU THOMSON, a citizen of the United States, and a resident of Lynn, in the county of Essex and State of Massachusetts, have invented certain new and useful Apparatus for Electric Welding, of which the following is a specification.

The present invention relates to an improvement in electric welding apparatus, whereby a number of pieces may be simultaneously or almost simultaneously subjected to the action of the welding currents.

The invention also contemplates means for controlling the flow or direction of flow of the current in wide or flat pieces which are to be welded by the electric current or heated thereby.

In the accompanying drawings, forming a part of this specification, Figure 1 is a plan of an apparatus embodying some of the features of my invention. Fig. 2 is a side view of the same. Fig. 3 shows a modified form of apparatus suitable to the work of welding plates of considerable width. Fig. 4 is a vertical section showing a part of Fig. 3. Figs. 5 and 6 show details of my invention. Fig. 7 is an illustrative diagram showing how the passage of the current is controlled in my apparatus. Fig. 8 shows a modified arrangement of the apparatus. Fig. 9 shows a further modification of the apparatus.

It is sometimes desirable to subject a number of similar pieces in rapid succession to the operation of electric welding, and my present apparatus is organized to hold such pieces in position, so that the current can be rapidly applied to do the work of welding.

Fig. 1 shows one form of the invention. On a base, B, of wood or other insulator, are mounted a number of fixed holding-clamps, C C C C C, and opposed to these clamps are a number of movable clamps, C' C' C' C' C', so related to the fixed clamps that bars of metal, or other pieces that are to be united, may have their abutted portions placed between the clamps for welding. The movable clamps C' C', &c., are impelled by springs Z Z, &c., or by any other suitable means—such as manual pressure, the force of a weight, fluid-pressure, or an electro-magnet—toward the fixed clamps C C, &c. The clamps C' C', &c., are borne upon a plate which connects them to the source of electric current, which may be led in by a heavy copper bar, K'. The clamps C C, &c., may be mounted, so as to be connected together by another bar or plate, but in the figure are shown as arranged to be successively connected by a switch, S; and indeed this arrangement, on account of the economy in current, is the preferable one. The switch S is made very massive, far more massive than the figure shows, and is connected to a heavy conductor, K, forming the other terminal of the current supplied. By swinging the switch so that the current passes successively through the clamps C C', &c., the pieces held thereby will be successively and very rapidly heated. The plates upon which the switch bears are in solid electric connection with the clamps C, and in fact may form part of them. By allowing the switch-surface S' to somewhat overlap the passage of the switch from point to point will be attended with no sparking.

In using the apparatus the pieces are put in place and the current turned on while the switch is in connection at any point, and by a movement of the switch the current is carried through all the pieces successively as they appear to have been sufficiently heated to weld.

The springs Z Z, &c., will furnish the requisite pressure to force the pieces to be welded into union during the passage of the current and to make a good contact between them before the passage of the current. The side view in Fig. 2 shows the relation of the various parts on edge.

In the welding together of the edges of wide sheets by electric currents it is desirable that provision be made to cause a uniform heating of the edges of the sheets where they rest in contact—that is, the heat should be in accordance with the work to be done. Thus, if one portion of an edge is more firmly in contact than another portion it will receive an undue heating before the other portions have reached their temperature for welding. In this case it is desirable to divert in a measure the current from the more highly-heated portions to those portions at which the heat is needed. The apparatus shown in Fig. 3 shows in general the method to be adopted in such circumstances. The clamps C C', &c., are made broad enough to hold the wide pieces B B' abutted between the clamps or overlapping slightly, as desired, and the pieces themselves B B' are by preference insulated from the clamps and the current led into them by pieces W X Y slipped under the clamp and above the plate B. The pieces W X Y are, however, kept out of contact with one another and only rest in electrical contact with the plates B B'. A switching-arm or switching-lever, S, connected with the source of current, is caused to traverse the pieces W X Y, so as to contact with one or two of them and pass from one to the other in the same way that the switch S, Fig. 1, may be caused to swing over the contact-pieces opposed to it. Such a switch is shown in Fig. 3; but it is to be understood that another may be provided to the left connecting on the contact-pieces carried by the clamp C'.

The arrangement of the clamps is shown in Fig. 4, where the plate B is carried and insulated from the clamp-body C' proper, while the switching-piece which carries in the current may be used where the edges of the pieces B B' are abutted together, as in Fig. 5, for welding or union or brazing; but the arrangement is best adapted to the condition seen in Fig. 6, where the edges of the pieces are caused to overlap slightly during the heating, and in which case, after the edge has been raised to the proper temperature, hammering may be used, as by a hammer, H, striking on the anvil at A to drive together and effect a close union of the particles of the edges of the sheets or pieces B B'.

The mode of operation in controlling the current is indicated in Fig. 7. Here the switches S S' are moved first into contact with W W, and pass current through that portion of the sheets B B' immediately adjacent or near to W W, and cause a rapid heating of the edge E at that point. Both switches may, however, be moved so as to successively contact with X and Y, and in that manner either cause a gradual progression of the heating area across the sheets from $e$ to $f$, where their edges are in contact; or, in case any portion of the contact or abutted edges has a lower temperature than any other, the current may be thrown toward that portion, so as to heat it, because the current will take the shortest path or path of least resistance. Should it be found, for example, that the edge $f$ requires a greater heating current, it can be diverted to that portion by the movement of the switches S S' to the points Y.

While I have described my invention as controlling the passage of current to the pieces at different points, I wish it to be understood that I do not limit myself to the switches S S' as the sole means for conveying current into the pieces, but may have independent conductors leading the current into the sheets B B' and across their places of junction, which current does the greater part of the heating at the junction, and the switch devices S S' may be used only as auxiliary means for causing a uniform heating of the junction, as in the case where a portion reaches a high temperature before another portion has been properly heated. Thus Fig. 9 illustrates a clamp provided with a broad piece of metal, A, fixed therein, the main welding currents being carried to the metal through the clamp from $l$. If the metal has a tendency to heat more rapidly at, say, $r$, than at $s$, the switch S is moved to the contact-plate W, and currents, preferably of a slightly higher potential, are supplied thereby to the metal piece A, imparting an additional amount of heat to the plate at $s$. The switch S is made so as to make contact with any one or any number of contact-plates W Y, thus allowing current to be fed at points where it is needed most.

In Fig. 8 the arrangement is modified, so that the switches S S' are replaced by rollers, between which rollers plates B B' are fed or moved. Thus the rollers S and M may pinch the plate B, while S' and N may hold the plate B'. The rollers S S' are of course kept insulated, as are also the rollers M and N, while the rollers S and M may connect with one terminal of the source of current and the rollers S' and N may connect with the other terminal. The position of the plates B B', which are presumed to overlap and to rest in contact where they meet, will govern the force or direction taken by the greatest current, and will therefore in a measure control the position at which the greatest heating will take place. By rolling the plates B B' backward and forward between the rollers, and at the same time pressing or hammering their overlapping or meeting edges together, a considerable width of plate may be effectually welded by the electric process.

What I claim as my invention is—

1. In an electric welding apparatus, a plurality of pairs of clamps arranged for holding a number of pieces to be welded in juxtaposition, substantially as specified.

2. In an electric welding apparatus, the combination, with a plurality of pairs of clamps for holding the pieces to be welded in juxtaposition, of means for applying the welding current in succession to each pair of clamps, as desired, substantially as specified.

3. In electric welding apparatus, the combination, with a plurality of pairs of clamps, of a switching arm and lever, whereby the current may be distributed to any pair of clamps, substantially as specified.

4. In electric welding apparatus, the combination, with a pair of clamps, of a plurality of pairs of separate contact-pieces held in electrical contact with the sheets or plates to be welded, and means for passing the welding current between any pair of contact-pieces, as may be desired, substantially as specified.

5. In electric welding apparatus, the combination, with a pair of clamps, of a plurality of separate contact-pieces arranged in pairs and inserted between the pieces to be welded and said clamps, and means for passing an electric current between any pair of contact-pieces and through the pieces to be welded, substantially as specified.

6. In an electric welding apparatus, the combination of a clamp, a plurality of pairs of separate contact-pieces held in electrical contact with the sheets or plates to be welded, means for passing a constant welding current through the sheets or plates to be welded, and means for passing a welding current of slightly higher potential between any pair of said contact-pieces, as may be desired, substantially as specified.

Signed at Lynn, in the county of Essex and State of Massachusetts, this 25th day of July, A. D. 1887.

ELIHU THOMSON.

Witnesses:
OTIS K. STUART,
J. W. GIBBONEY.